(12) United States Patent
Kawatahara et al.

(10) Patent No.: US 7,447,596 B2
(45) Date of Patent: Nov. 4, 2008

(54) DATA COMMUNICATION ADAPTOR

(75) Inventors: Masanao Kawatahara, Kyoto (JP);
Toshiyuki Ootsuki, Kyoto (JP)

(73) Assignee: Arkray, Inc., Kyoto (JP)

( * ) Notice: Subject to any disclaimer, the term of this patent is extended or adjusted under 35 U.S.C. 154(b) by 1159 days.

(21) Appl. No.: 10/479,762

(22) PCT Filed: Jun. 4, 2002

(86) PCT No.: PCT/JP02/05516

§ 371 (c)(1),
(2), (4) Date: Dec. 3, 2003

(87) PCT Pub. No.: WO02/099768

PCT Pub. Date: Dec. 11, 2002

(65) Prior Publication Data

US 2004/0153585 A1    Aug. 5, 2004

(30) Foreign Application Priority Data

Jun. 5, 2001  (JP) .............................. 2001-170052

(51) Int. Cl.
*G01N 19/00* (2006.01)
(52) U.S. Cl. ..................................................... 702/32
(58) Field of Classification Search ................. 702/32; 600/300; 346/44; 705/2
See application file for complete search history.

(56) References Cited

U.S. PATENT DOCUMENTS

| | | | |
|---|---|---|---|
| 6,101,478 A | * | 8/2000 | Brown .............................. 705/2 |
| 6,301,100 B1 | * | 10/2001 | Iwata .......................... 361/683 |
| 6,558,320 B1 | * | 5/2003 | Causey et al. ................ 600/300 |
| 6,562,625 B2 | * | 5/2003 | Modzelewski et al. ......... 436/44 |

FOREIGN PATENT DOCUMENTS

| | | |
|---|---|---|
| JP | 7-177208 | 7/1995 |
| JP | 3024751 U | 3/1996 |
| JP | 2671488 | 7/1997 |
| JP | 11-289372 | 10/1999 |
| JP | 2000-132622 | 5/2000 |
| JP | 2000-232964 | 8/2000 |
| JP | 2000-271097 | 10/2000 |
| JP | 2001-095260 | 4/2001 |
| JP | 2001-104257 | 4/2001 |
| JP | 2001-109545 | 4/2001 |
| WO | WO 97/49077 | 12/1977 |

* cited by examiner

*Primary Examiner*—Tung S Lau
*Assistant Examiner*—Xiuquin Sun
(74) *Attorney, Agent, or Firm*—Hamre, Schumann, Mueller & Larson, P.C.

(57) ABSTRACT

A data communication adaptor (1) is provided which includes a data inputting unit (63) for inputting data from a first information processing apparatus (3) and a data outputting unit (64) for outputting data to a second information processing apparatus (2). The data communication adaptor (1) further includes a memory (65) for storing a plurality of pieces of data which are inputted through the data inputting unit (63) and include data-discriminating information for discrimination from other data pieces, while also including a selector (66) for selecting the data satisfying a particular condition from the plurality of data pieces stored in the memory (65) based on the data-discriminating information, a data processor (68) for processing the data selected by the selector (66) and a controller (69) for controlling outputting of data through the data outputting unit (64).

16 Claims, 6 Drawing Sheets

DATA COMMUNICATION ADAPTOR

TECHNICAL FIELD

The present invention relates to a data communication adaptor which, in use, is connected to two information processing apparatuses for processing data from one information processing apparatus and inputting the data to the other information processing apparatus.

BACKGROUND ART

It is important for diabetics to regularly check their own blood glucose level for controlling the blood glucose level. However, it is troublesome to frequently visit a medical institution for measuring the blood glucose level. In light of this, portable handheld blood glucose level measuring apparatuses are used, whereby diabetics can easily and conveniently measure the blood glucose level even when they are away from home, for example.

Basically such a portable blood glucose level measuring apparatus is used for controlling the blood glucose level by diabetics themselves based on the measurement results. However, even in such a case, it is preferable to regularly receive professional instructions from a doctor or a specialist, for example. For receiving instructions, the measurement results may need to be shown regularly to a specialist. For this purpose, a hard copy of the measurement data may need to be handed to the specialist, or the blood glucose level measuring apparatus may need to be brought to the medical institution to enable the specialist to access the data. After all, such methods also necessitate a visit to the medical institution, which is troublesome.

To avoid the above trouble, the measurement data stored in the blood glucose level measuring apparatus may be transmitted to a computer of the medical institution through telecommunication lines. However, a typical portable blood glucose level measuring apparatus does not have the function for telecommunications. Therefore, the blood glucose level measuring apparatus may be connected to a cell phone for inputting data into the cell phone and transmitting the data to a computer of a medical institution by e-mail, for example. To transmit the data stored in the blood glucose level measuring apparatus using the cell phone, data processing such as conversion of the data format is necessary. Therefore, the blood glucose level measuring apparatus is connected to the cell phone via a data communication adaptor capable of performing such data processing.

Generally, the portable blood glucose level measuring apparatus can store a plurality of pieces of measurement data (e.g. 120 pieces) so that the patient can observe the change of the measurement data. However, the portable blood glucose level measuring apparatus generally does not have the function of outputting particular pieces of measurement data selected from the stored measurement data, or outputting only new data without outputting old measurement data which has been outputted before. The cell phone does not have such a function, either. Therefore, when measurement data is to be transmitted using the cell phone, a large amount of data including those previously transmitted to the computer of the medical institution are inputted into the cell phone and transmitted to the computer of the medical institution. As a result, a relatively long time is taken for transmitting the measurement data, which results in high communication charge.

Such a problem is not limited to the case where the data stored in the blood glucose level measuring apparatus is transmitted through the cell phone but occurs similarly in the case where data is transmitted from an information processing apparatus which does not have the telecommunication function to another information processing apparatus having the communication function.

Figure 8:
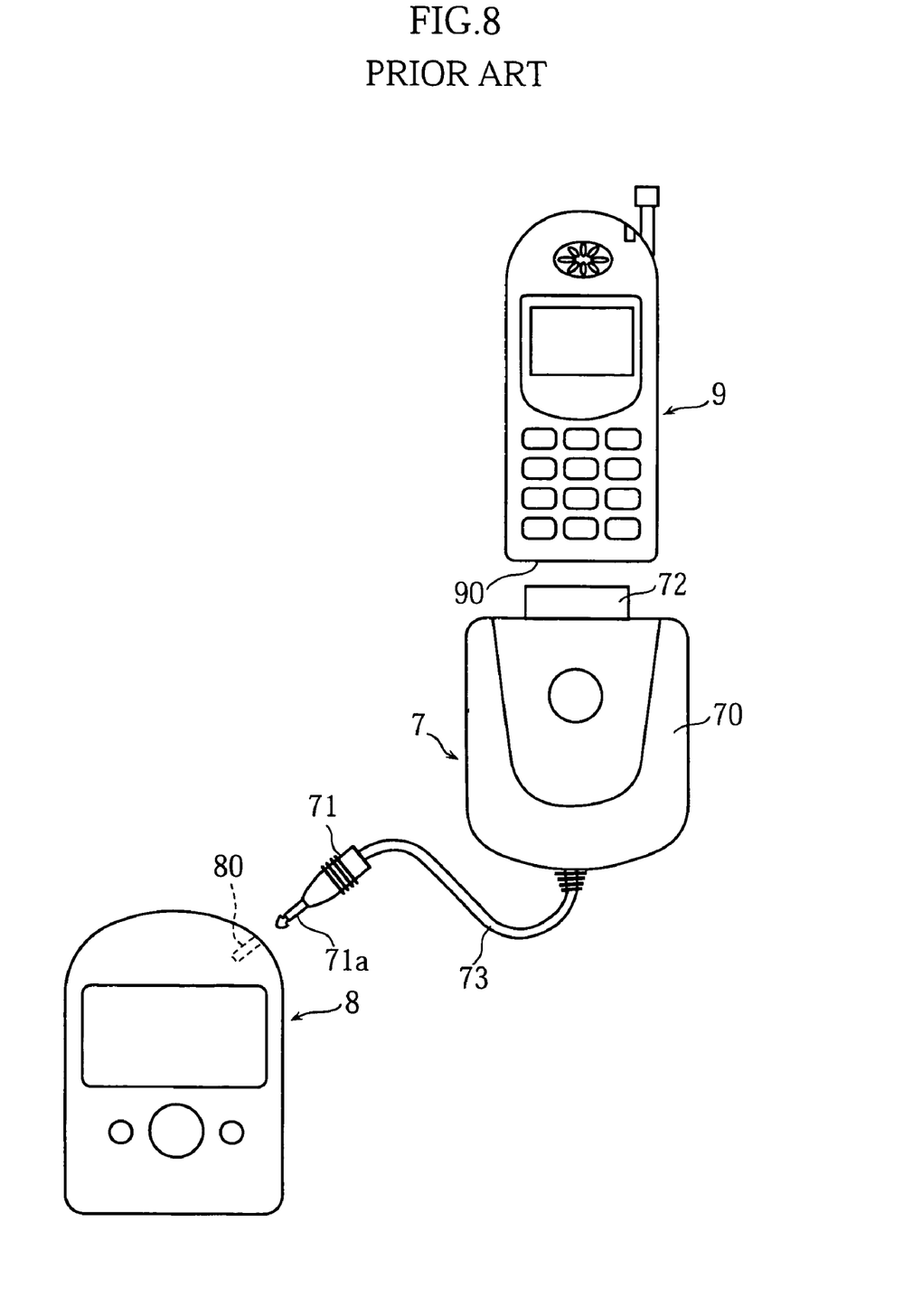
FIG. 8 is a plan view of a prior art data communication adaptor illustrated together with a cell phone and a blood glucose level checker for connection to the adaptor.

As shown in FIG. 8, a data communication adaptor includes an adaptor body 70, a first terminal 71 for connection to an output terminal 80 of a blood glucose level measuring apparatus 8, and a second terminal 72 for connection to an input terminal 90 of a cell phone 9. In the illustrated data communication adaptor 7, the first terminal 71 is connected to the adaptor body 70 via a flexible cable 73. This structure is employed to provide elasticity (flexibility) between the data communication adaptor 7 and the blood glucose level measuring apparatus 8 when the cell phone 9 and the blood glucose level measuring apparatus 8 connected to each other via the data communication adaptor 7 are placed on a desk, for example.

By connecting the first terminal 71 to the blood glucose level measuring apparatus 8 using the cable 73, the convenience in handling can be enhanced. However, when the adaptor is not in use, the cable 73 extending out from the adaptor body 70 for connection to the first terminal 71 makes it difficult to store the adaptor. Further, since a conductor portion 71a of the first terminal 71 is always exposed, dust may adhere to the conductor portion due to the generation of static electricity. When the first terminal 71 in such a state is connected to the output terminal 80 of the blood glucose level measuring apparatus 8, the electric circuit of the blood glucose level measurement apparatus 8 may be broken.

Such a problem is not limited to the case where the blood glucose level measuring apparatus 8 and the cell phone 9 are connected via the communication adaptor 7 but occurs similarly in the case where other two information processing apparatuses are connected via the communication adaptor 7.

DISCLOSURE OF THE INVENTION

An object of the present invention is to reduce the time communication cost required for data transmission when data inputted from an information processing apparatus is processed and transmitted through another information processing apparatus by telecommunications.

Another object of the present invention is to provide a data communication adaptor which can be conveniently stored when it is not in use.

According to a first aspect of the present invention, there is provided a data communication adaptor provided with data inputting unit for inputting data from a first information processing apparatus and a data outputting unit for outputting data to a second information processing apparatus. The adaptor further comprises a memory for storing a plurality of pieces of data inputted through the data inputting unit, a selector for selecting data satisfying a particular condition from the pieces of data stored in the memory, and a controller for controlling outputting of data through the data outputting unit.

Each of the plurality of data pieces may include data-discriminating information for discrimination from the others of the data pieces. In that case, the selector determines, based on the data-discriminating information, whether or not the particular condition is satisfied.

For example, the first information processing apparatus may be a concentration measuring apparatus for measuring the concentration of a particular component in a biological sample, the apparatus being capable of storing a plurality of pieces of measurement data and collectively outputting the plurality of measurement data pieces to the outside.

In this case, the plurality of measurement data pieces are stored in the memory.

For example, the concentration measuring apparatus may be a portable apparatus for measuring the glucose concentration in blood.

The data-discriminating information may be information specifying time and date of measurement or order of measurement, for example. In that case, the particular condition is that the time and date of measurement are later than those of the measurement data previously outputted to the second information processing apparatus. The measurement data previously outputted are stored in the memory, for example. At that time, the selector compares the plural pieces of measurement data stored in the memory with the previously outputted measurement data and selects, from the plural pieces of data, the data measured later than the previously outputted data based on the data-discriminating information. In response to this, the controller causes the data to be outputted to the second information processing apparatus through the data outputting unit based on the data selected by the selector.

Alternatively, the data-discriminating information may be a measurement value. In that case, the particular condition is that the measurement value is greater than a predetermined threshold value or smaller than the predetermined threshold value. The selector compares the measurement data with the threshold value stored in the memory in advance, and selects the data whose value is greater than the threshold value or smaller than the threshold value.

Preferably, the second information processing apparatus includes a data transmitter. More preferably, the second information processing apparatus is a portable communication terminal (such as a cell phone or a PDA) for transmitting data through telecommunication lines.

When the second information processing apparatus has a data transmitter, it is preferable that the memory of the data communication adaptor stores identifying information for identifying a third information processing apparatus to which the data is transmitted from the second information processing apparatus. Preferably, the controller of the data communication adaptor instructs the data transmitter to determine the third information processing apparatus corresponding to the identifying information and to transmit the data to the third information processing apparatus when the data from the first information processing apparatus is inputted through the data inputting unit.

The second information processing apparatus may be capable of transmitting data to a plurality of third information processing apparatuses and may store the addresses of the respective third information processing apparatuses. In that case, the controller of the data communication adaptor instructs the data transmitter to select the address corresponding to the identifying information and to transmit the data to the third information processing apparatus. Examples of the address include an e-mail address and a URL.

Preferably, the data communication adaptor further includes a data processor for converting a data format to the format appropriate for the third data processing apparatus determined by the controller. The data processor may have a function to calculate the average value or the standard deviation when a plurality of measurement data pieces are selected by the selector or a function to correct the measurement data.

Preferably, the data communication adaptor further includes an identifying unit for identifying the first information processing apparatus, based on individual information allocated to the first information processing apparatus and outputted from the first information processing apparatus.

In this case, the memory stores a plurality of pieces of individual information. On the other hand, the identifying unit compares the individual information outputted from the first information processing apparatus with the plurality of pieces of individual information stored in the memory to identify the first information processing apparatus based on the comparison. The controller determines the third information processing apparatus corresponding to the first information processing apparatus identified by the identifying unit and transmits data to the third information processing apparatus.

For example, the controller instructs the memory to store the individual information outputted from the first information processing apparatus when the identifying unit determines that the individual information outputted from the first information processing apparatus is not included in the plurality of pieces of individual information stored in the memory.

According to a second aspect of the present invention, there is provided a data communication adaptor for interconnecting a first information processing apparatus and a second information processing apparatus for inputting data into the second information processing apparatus based on data from the first information processing apparatus. The adaptor comprises an adaptor body, a first terminal for connection to the first information processing apparatus and a second terminal for connection to the second information processing apparatus. At least one of the first terminal and the second terminal is connected to a cable and further to the adaptor body. The adaptor body includes a storage section for accommodating the terminal connected to the cable.

Preferably, the storage section includes a groove provided at the periphery of the adaptor body for accommodating the cable. For example, the terminal connected to the cable includes a conductor pin. In that case, the storage section preferably includes an inserting portion into which the conductor pin is inserted.

The data communication adaptor may further comprise a detector for detecting that the conductor pin is inserted into or pulled out of the inserting portion. In that case, power to the adaptor may be automatically turned off when the detector detects that the conductor pin is inserted into the inserting portion, while it may be turned on when the detector detects that the conductor pin is pulled out of the inserting portion.

The terminal connected to the cable has a connecting portion to the cable, the connecting portion being covered with a protector having a sectional area larger than that of the cable. In that case, the storage section includes a first opening having a width corresponding to the sectional configuration of the cable and a second opening having a width larger than that of the first opening and corresponding to the sectional configuration of the protector.

Also in this aspect, examples of first information processing apparatus include an apparatus for measuring the glucose concentration in blood. Examples of second information processing apparatus include a portable communication terminal (such as a cell phone or a PDA) for transmitting data through telecommunication lines.

BEST MODE FOR CARRYING OUT THE INVENTION

Figure 1:
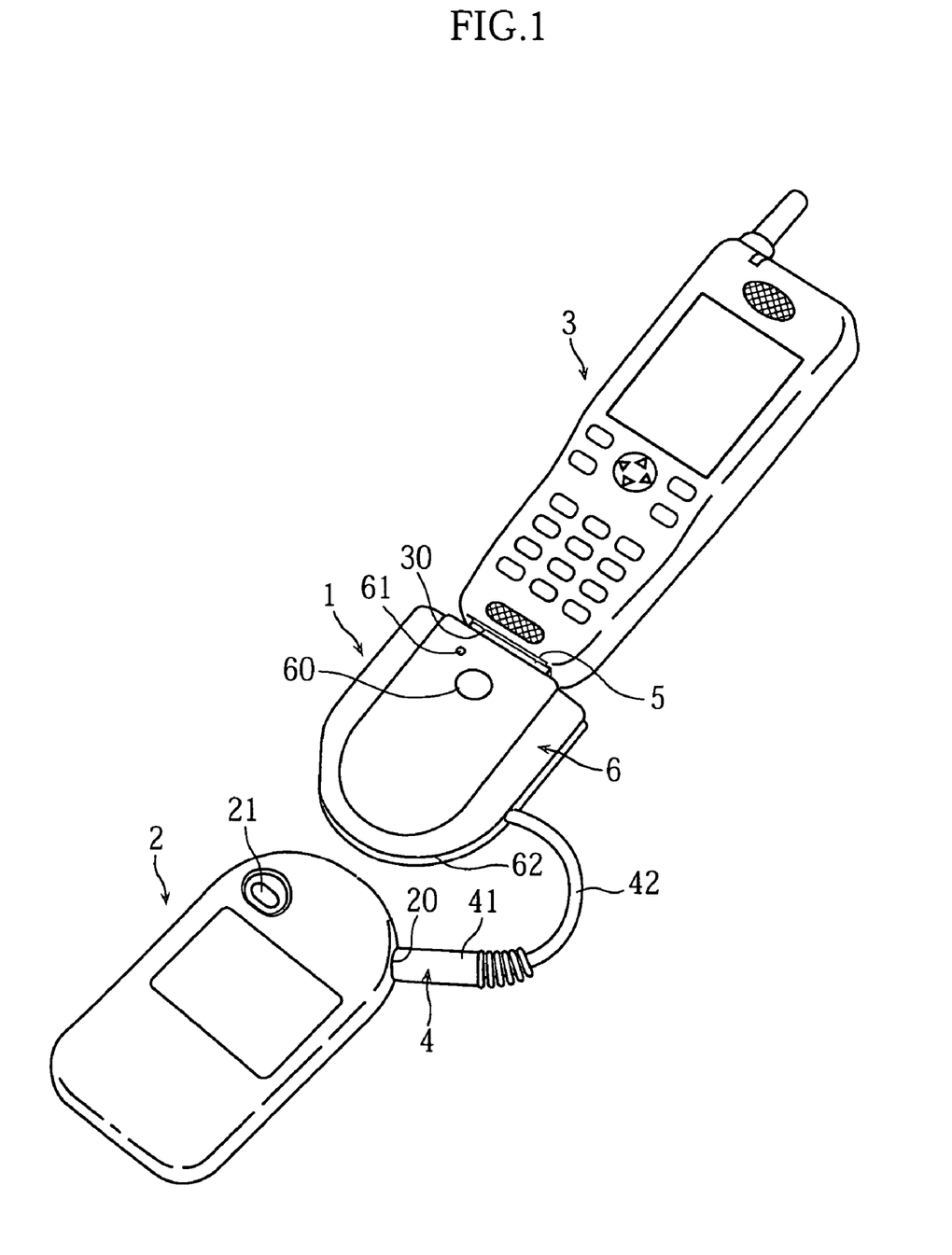
FIG. 1 is a perspective view illustrating a data communication adaptor in use according to the present invention.
Figure 2:
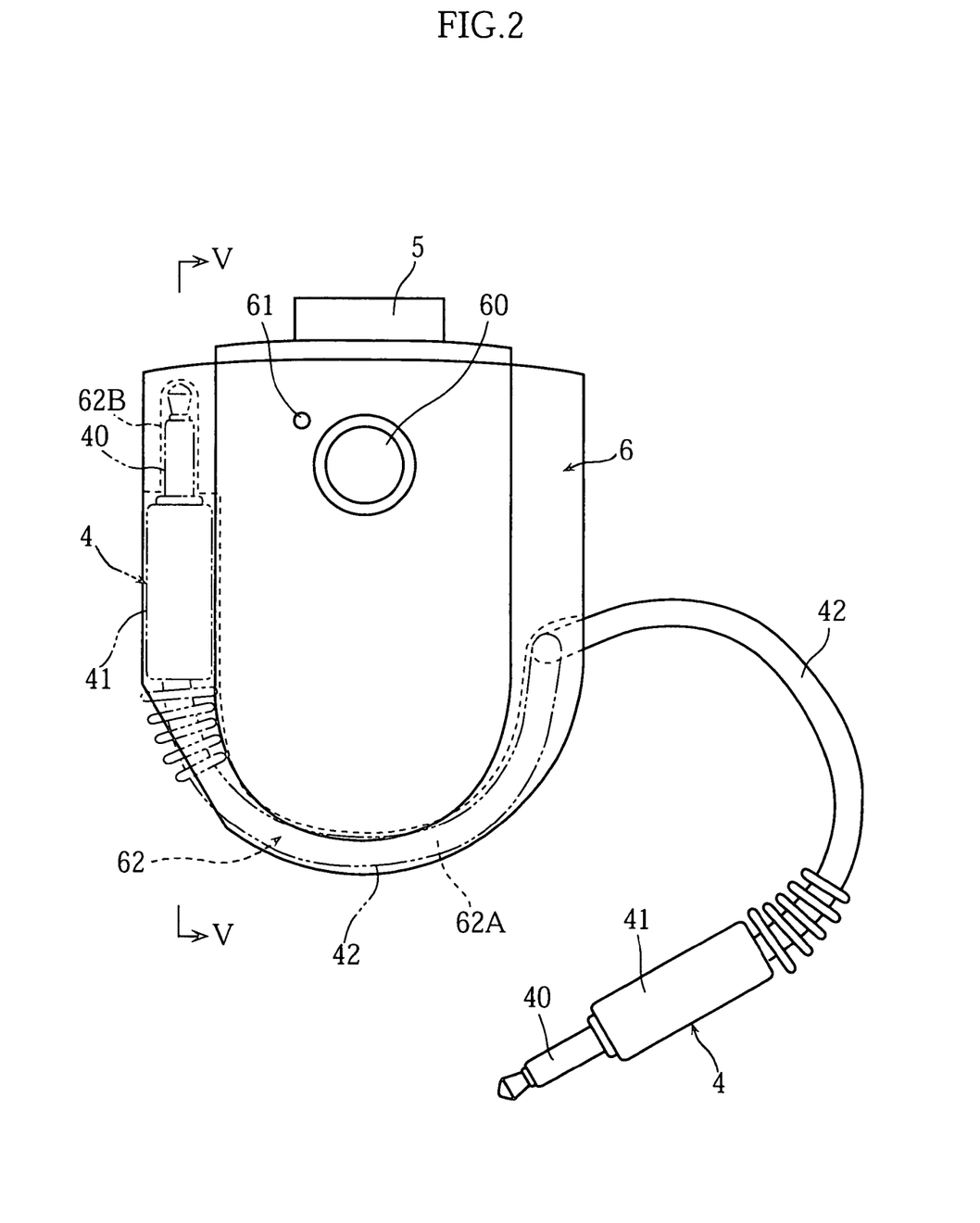
FIG. 2 is a plan view of the data communication adaptor shown in FIG. 1.
Figure 3:
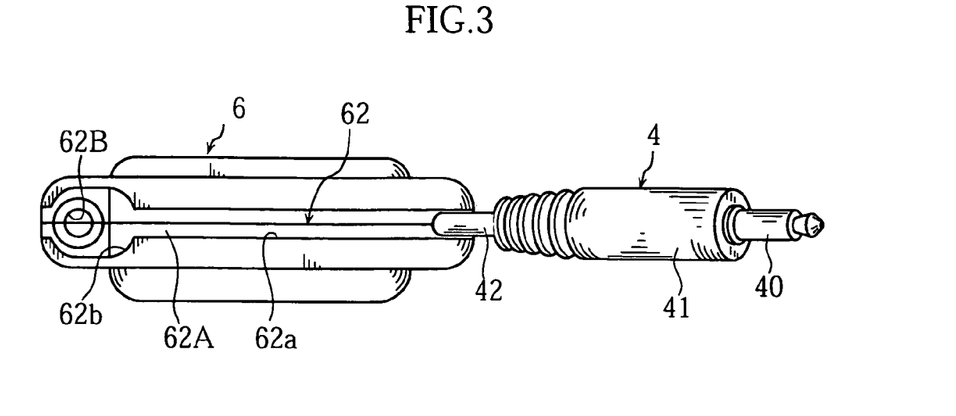
FIG. 3 is a front view of the data-communication adaptor shown in FIG. 1.
Figure 4:
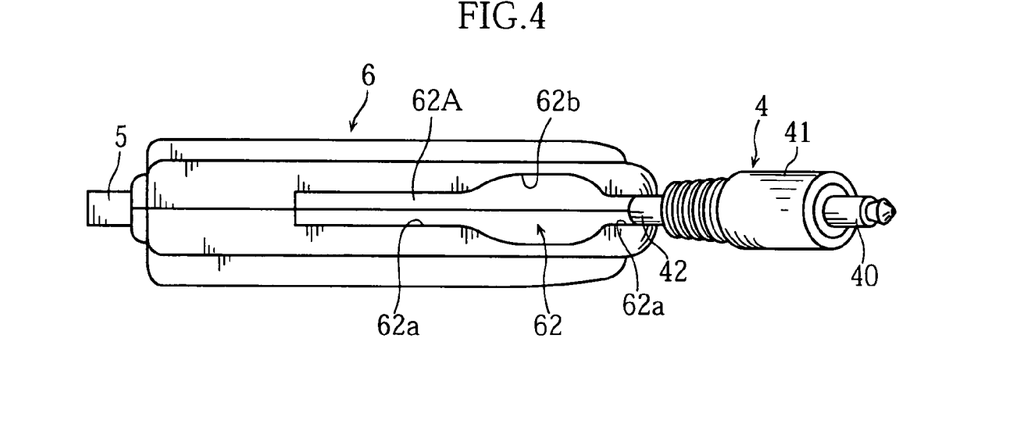
FIG. 4 is a side view of the data communication adaptor shown in FIG. 1.

As shown in FIGS. 1 and 2, a data communication adaptor 1 is an apparatus to input data into a cell phone 3 (an example of second information processing apparatus) based on data outputted from a Blood Glucose Level checker 2 (an example of first information processing apparatus).

The BGL checker 2 measures the glucose concentration (blood sugar level) in blood using a biosensor (not shown) having a pair of electrodes and a reacting portion. Specifically, with the biosensor mounted to the apparatus, blood is introduced to the reacting portion, and the oxidation current is measured by the pair of electrodes for determining the glucose concentration in blood based on the oxidation current.

The blood glucose level checker 2 can store a plurality of pieces of measurement data and can store 120 pieces of measurement data at the maximum, for example. However, the blood glucose level checker 2 does not have a data transmission function through telecommunication lines. Each piece of the measurement data at least includes information about the time and date of measurement (order of measurement) and information about the blood glucose level. Each piece of measurement data is discriminated from other pieces of measurement data based on at least either of such information.

When the power is turned on by pressing a switch 21, the blood glucose level checker 2 determines whether or not a terminal of another apparatus is inserted into an output terminal 20. When it is determined that a terminal of another apparatus is inserted in the output terminal 20, all the data stored in a specific memory region is collectively outputted. The data outputted at that time includes all of the measurement data stored and the Serial Number of the blood glucose level checker 2.

The cell phone 3, which has a data communication function through telecommunication lines, can transmit data to an intended information processing terminal by access to a homepage or by an e-mail, for example.

The data communication adaptor 1 includes a first terminal 4, a second terminal 5 and an adaptor body 6. In use, the first terminal 4 is connected to the output terminal 20 of the blood glucose level checker 2, whereas the second terminal 5 is connected to an input terminal 30 of the cell phone 3.

The first terminal 4, which comprises a so-called pin jack (pin male terminal), includes a conductor pin 40 and a protector 41. The first terminal 4 is connected to the adaptor body 6 via a flexible cable 42. The adaptor body 6 incorporates an electric circuit (not shown) for realizing various means, which will be described later. The electric circuit is electrically connected to the first terminal 4 via the cable 42. Thus, output from the blood glucose level checker 2 is inputted into the electric circuit through the first terminal 4 and the cable 42.

The second terminal 5, which comprises a multielectrode connector, is connected to the adaptor body 6 and hence to the electric circuit. Thus, output from the data communication adaptor 1 is inputted into the cell phone 3 through the second terminal 5.

The adaptor body 6 is provided with a press button 60, an indication lamp 61 and a storage section 62.

The press button 60 is used to instruct transmission of measurement data. By varying the time period for pressing the press button 60 for example, it is possible to instruct transmission of only the measurement data selected by a selector 66, which will be described later, or to instruct transmission of all the data inputted from the blood glucose level checker 2 (See FIG. 6). The press button 60 may function as an operation portion for turning on and off the power.

By varying the lighting cycle of the indication lamp 61 for example, the indication lamp 61 can indicate whether the current state is a mode for transmitting the selected measurement data only or a mode for transmitting all the measurement data.

Figure 5:
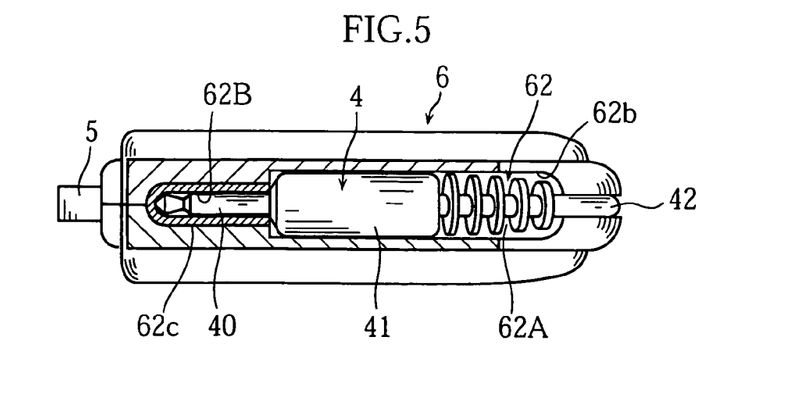
FIG. 5 is a sectional view taken along lines V-V in FIG. 2.

As shown in FIGS. 2 and 5, the storage section 62 includes a main accommodating portion 62A, and an inserting portion 62B connected to a first end of the main accommodating portion 62A. The main accommodating portion 62A accommodates the protector 41 of the first terminal 4 and the cable 42, whereas the inserting portion 62B accommodates the conductor pin 40 of the first terminal 4.

The main accommodating portion 62A, which extends along the periphery of the adaptor body 6, has a length corresponding to the total length of the cable 42 and the protector 41 of the first terminal 4. The main accommodating portion 62A, which comprises a groove, has a second end to which the cable 42 is connected. The groove includes a first opening 62a and a second opening 62b which are open in an outward direction perpendicular to the thickness of the adaptor body 6.

The first opening 62a has a width corresponding to the diameter of the cable 42. The second opening 62b has a width which is larger than that of the first opening 62a and which corresponds to the diameter of the protector 41. Therefore, the protector 41 can be easily inserted in the first end of the main accommodating portion 62A.

Since the storage section 62 has the above-described structure, the first terminal 4 can be easily accommodated in the storage section 62 by the insertion through the second opening 62b while inserting the conductor pin 40 into the inserting portion 62B. At that time, the cable 42 is accommodated in the main accommodating portion 62A by flexing along the periphery of the adaptor main body 6.

The inserting portion 62B has an inner surface provided with a conductor portion 62c. When the conductor pin 40 is inserted into the inserting portion 62B, the conductor pin 40 comes into contact with the conductor portion 62c.

When the conductor pin 40 is accommodated in the inserting portion 62B, the data communication adaptor 1 is not connected to the blood glucose level checker 2. Therefore, the power to the data communication adaptor may be automatically turned off when the insertion of the conductor pin 40 into the inserting portion 62B, i.e. the contact between the conductor portion 62c and the conductor pin 40 is detected. Conversely, the power to the data communication adaptor 1 may be automatically turned on when disengagement of the conductor pin 40 from the conductor portion 62c, i.e. the pulling of the conductor pin 40 out of the inserting portion 62B is detected. These structures can be realized by installing, in a ROM for example, a program for turning on/off the power in accordance with the contact/non-contact between the conductor portion 62c and the conductor pin 40.

When the data communication adaptor 1 is not used, the conductor pin 40 can be accommodated in the inserting portion 62B, whereas the protector 41 and the cable 42 can be accommodated in the main accommodating portion 62A. In this state, the cable 42 and the first terminal 4 do not protrude out from the adaptor body 6, which is convenient for carrying and storing. Further, the insertion of the conductor pin 40 into the inserting portion 62B prevents dust from adhering to the conductor pin when it is not used. Accordingly, it is possible to reduce the possibility that the first terminal 4 carrying dust adhered thereto is inserted into the output terminal 20 of the blood glucose level checker 2. Therefore, the breakage of the electric circuit of the blood glucose level checker 2 is prevented.

In the data communication adaptor in this embodiment, only the first terminal is connected to the adaptor body via a cable. However, the above-described advantages by the provision of the storage section can be obtained provided that at least one of the first and the second terminals is connected to the adaptor main body via a cable. Further, the configuration of the storage section may be varied in many ways.

Next, the function and the measurement data transmitting operation of the data communication adaptor 1 will be described with reference to FIGS. 6 and 7.

Figure 6:
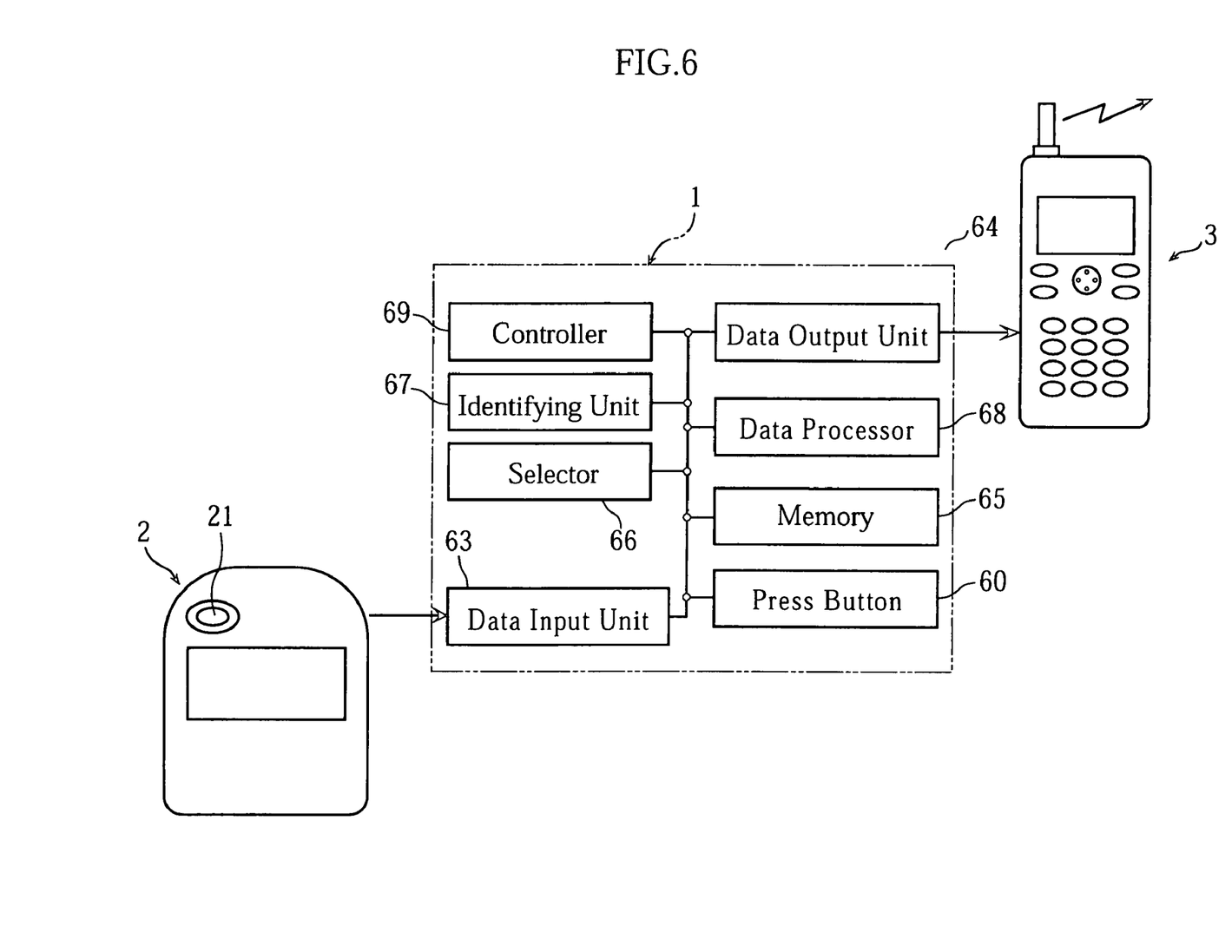
FIG. 6 is a block diagram of the data communication adaptor illustrated together with a blood glucose level checker and a cell phone for connection to the data communication adaptor, which are schematically illustrated in plan view.

As shown in FIG. 6, the data communication adaptor 1 includes a data inputting unit 63, a data outputting unit 64 and various kinds of means realized by the electric circuit. The data inputting unit 63 functions to input an output from the blood glucose level checker 2 to the electric circuit and includes the first terminal 4 (See FIG. 2). The data outputting unit functions to input an output from the electric circuit to the cell phone 3 and includes the second terminal 5 (See FIG. 2).

The data communication adaptor 1 further includes a memory 65, a selector 66, an identifying unit 67, a data processor 68 and a controller 69. As described above, these means are realized by the electric circuit which may comprise a CPU (MPU), a ROM, a RAM and so on.

The memory 65 stores the serial number of the blood glucose level checker 2, a plurality of pieces of measurement data outputted from the blood glucose level checker 2, and measurement data previously outputted to the cell phone 3, for example. Each piece of the measurement data includes information about the time and date of measurement (order of measurement) and information about the blood glucose level. Each of the measurement data is discriminated (distinguished) from other pieces of measurement data based on at least either of such information (data-discriminating information). The memory 65 further stores the URL of a homepage to be accessed by the cell phone 3, the mail address of a recipient of measurement data, or identification cords corresponding to these (a registration number, for example).

Based on the data discriminating information, the selector 66 selects the data satisfying a particular condition from the plural pieces of measurement data. For example, when the data-discriminating information relates to the time and date of measurement or the order of measurement, the selector 66 compares the plural pieces of measurement data with the previously outputted measurement data stored in the memory 65 and selects, from the plural pieces of data, the data measured later than the previously outputted data. When the data-discriminating information relates to a blood glucose level, the selector 66 selects the measurement data whose value is larger than a predetermined threshold value or the measurement data whose value is smaller than the predetermined threshold value.

The identifying unit 67 identifies the model (company name, type or the like) of the cell phone 3 to obtain information about the communication protocol of the cell phone 3. Further, when the serial number of the blood glucose level checker 2 is transmitted from the blood glucose level checker 2, the identifying unit 67 determines whether or not the serial number has already been stored in the memory 60 and identifies the blood glucose level checker 2.

The data processor 68 compresses the measurement data selected by the selector 66 for conversion into the format in accordance with the communication protocol of the cell phone 3. The data processor 68 may have a function to calculate the average value or the standard deviation or to correct the measurement data when a plurality of data pieces are selected by the selector 66.

The controller 69 performs various instructions and control in executing a program for operating the units 65-68.

Figure 7:
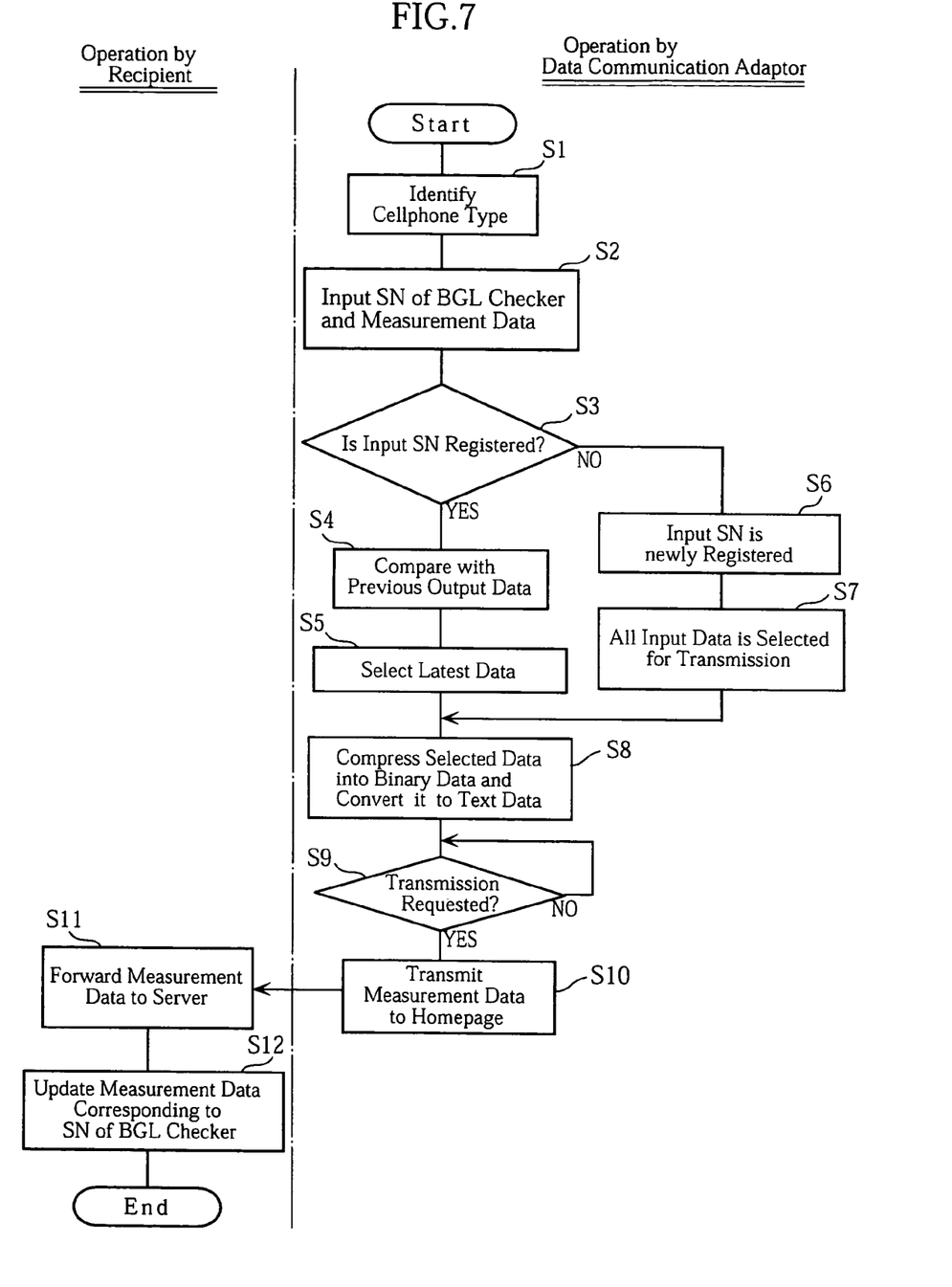
FIG. 7 is a flow chart illustrating the transmitting operation of measurement data.

With the data communication adaptor 1 having the above-described structure, measurement data is outputted to the cell phone 3, and the data is transmitted to a server by utilizing the communication function of the cell phone 3 in such a manner as shown in FIG. 7, for example. The measurement data is finally transmitted to a terminal such as a computer of a medical institution. However, the process of measurement data transmission by the data communication adaptor 1 is not limited to that shown in FIG. 7.

As shown in FIG. 7, in the data communication adaptor 1, the controller 69 first instructs the identifying unit 67 to identify the model of the cell phone 3 connected to the data communication adaptor 1 (S1). Thereafter, the serial number of the blood glucose level checker 2 and measurement data are inputted via the data inputting unit 63 for storage in the memory 65 (S2).

As described above, when the power is turned on, the blood glucose level checker 2 determines whether or not the output terminal 20 is connected to an external apparatus, and when an external apparatus is determined to be connected, the apparatus outputs the data stored in a specific memory region. Therefore, when the blood glucose level checker 2 is turned on after the first terminal 4 of the data communication adaptor 1 is connected to the output terminal 20 of the blood glucose level checker 2, a plurality of pieces of measurement data and the serial number are automatically inputted into the data communication adaptor 1. Alternatively, output from the blood glucose level checker 2 may be inputted into the memory 65 of the data communication adaptor 1 when the press button 60 of the data communication adaptor 1 is pressed.

Subsequently, the controller 69 instructs the identifying unit 67 to determine whether or not the inputted serial number has already been stored (recorded) in the memory (S3). If the identifying unit 67 determines that the serial number has already been stored (S3:YES), the controller 69 instructs the selector 66 to select the latest data piece from the plurality of measurement data pieces (S5). The selection of the latest data is performed by comparing the plurality of measurement data pieces newly inputted into the memory 65 with the measurement data previously outputted and already stored in the memory 65 (S4). Specifically, the selector selects the latest measurement data by comparing information about the time and date of measurement included in the measurement data.

If the identifying unit 67 determines that the serial number has not been already stored (S3:NO), the controller 69 instructs the memory 65 to store (newly record) the serial number (S6) and instruct the selector 66 to select all of the inputted measurement data (S7).

Subsequently, the controller 69 instructs the data processor 68 to compress all of the selected measurement data and convert the compressed binary data into data with an appropriate format corresponding to the type of the cell phone 3 (S8). It is to be noted that the identification of the model of the cell phone 3 connected to the data communication adaptor 1 may be performed immediately before the data processing is performed by the data processor 68, instead of performing in S1. When a plurality of measurement data pieces are selected, the data compression and the like may be performed after the average value or the standard deviation is calculated or the measurement data is corrected.

Subsequently, the controller 69 checks whether or not transmission of measurement data is requested (S9). In the case of the data communication adaptor 1 which transmits data when the press button 60 is pressed, whether or not the data transmission is requested is determined by whether or not the press button 60 is pressed. In the case of a data communication adaptor which takes measurement data from the blood glucose level checker 2 when the press button 60 is pressed, the pressing operation of the press button may be regarded as a request for data transmission. In the case where the request for data transmission is performed by key input by the cell phone 3, the key input is regarded as a request for data transmission.

When the controller 69 determines that the data transmission is not requested, the controller continuously checks the request for transmission until it is made (S9:YES). If the controller 69 confirms that the request for data transmission is made (S9:YES), the measurement data is transmitted to a homepage established by the recipient of the measurement data (e.g. a medical institution) (S10).

The measurement data transmitted to the homepage is transferred to the server (S11). Alternatively, the measurement data may be transmitted to the terminal of the recipient such as a medical institution by an e-mail without going through the homepage.

For accessing to the homepage or sending an e-mail for transmitting the measurement data, the URL or mail address stored in the memory 65 may be automatically inputted into the cell phone 3 by the operation of the controller 69, for example. Alternatively, by the operation of the controller 69, an identification code associated with the URL or mail address stored in the memory 65 is inputted into the cell phone 3 so that the one corresponding to the identification code is selected from a plurality of URLs or addresses recorded in the address book of the cell phone 3 for transmitting the measurement data. By designating the recipient of the data in the above-described manner, it is possible to eliminate the work for inputting the recipient as well as erroneous transmission due to the erroneous inputting of the recipient.

On the other hand, the recipient of the measurement data updates the measurement data corresponding to the serial number (S12). When the terminal (personal computer) itself of the recipient is the server, the updating of the measurement data is performed by updating the measurement data stored in the server. When the terminal of the recipient is not the server, the updating of the measurement data is performed by taking the measurement data from the server.

The recipient, if it is a medical institution, analyzes and manages the blood glucose level of the sender (a diabetic or a person who wishes the blood glucose level analysis, for example) identified by the serial number and notifies the sender of the analysis result from a medical standpoint or advises the sender on the lifestyle, as required. Such notification and advice can also be sent through an e-mail. Therefore, the diabetic or the like can control the blood glucose level under the direction of a professional such as a doctor without the need for frequently visiting the medical institution.

The above-described data communication adaptor 1 can select and transmit only the data whose measurement time and date is later than that of the measurement data previously outputted instead of outputting all the measurement data inputted from the blood glucose level checker 2 to the cell phone. Therefore, the amount of data transmitted to the cell phone 3 can be reduced, which leads to the reduction of the communication time as well as the reduction of the communication cost.

Moreover, since the measurement data is processed after the model of the cell phone 3 is identified, the data communication adaptor is applicable for cell phones of various communication protocols. The present invention is also applicable to data transmission through wire communication using a fixed telephone apparatus connected to a terminal such as a personal computer. Further, the above-described data communication adaptor can be utilized also for data transfer between information processing apparatuses other than between a blood glucose level checker and a cell phone.

In this embodiment, a blood glucose level checker is described as an example of first information processing apparatus, whereas a cell phone is described as an example of second information processing apparatus. However, the first and the second information processing apparatuses to which the data communication adaptor of the present invention is applicable are not limited to those. For example, the first information processing apparatus may be a cell phone, whereas the second information processing apparatus may be a blood glucose level checker. One of the first and the second information processing apparatuses may be a communication terminal other than a cell phone capable of transmitting data through telecommunications, which may be a PDA having a communication function, for example. In that case, the other one of the information processing apparatuses may be a concentration measuring apparatus other than a blood glucose level checker, which may be an apparatus for performing measurement of a blood cholesterol level or measurement for a biochemical sample other than blood, for example.

The invention claimed is:

1. A data communication adaptor provided with a data inputting unit for inputting data from a first information processing apparatus and a data outputting unit for outputting data to a second information processing apparatus, the adaptor further comprising:
   a memory for storing a plurality of pieces of data inputted through the data inputting unit;
   a selector for selecting data satisfying a particular condition from the pieces of data stored in the memory; and
   a controller for controlling the outputting of data through the data outputting unit;
   wherein the second information processing apparatus includes a data transmitter for transmitting data to a third information processing apparatus;
   wherein the memory stores identifying information for identifying the third information processing apparatus to which the data is transmitted; and
   wherein the controller instructs the data transmitter to determine the third information processing apparatus corresponding to the identifying information and to transmit the data to the third information processing apparatus when the data from the first information processing apparatus is inputted through the data inputting unit.

2. The data communication adaptor according to claim 1, wherein each of the pieces of data includes data-discriminating information for discrimination from other pieces of the data; and wherein the selector determines, based on the data-discriminating information, whether or not the particular condition is satisfied.

3. The data communication adaptor according to claim 2, wherein the first information processing apparatus is a concentration measuring apparatus for measuring concentration of a particular component in a biological sample, the apparatus being capable of storing a plurality of pieces of measurement data and collectively outputting the pieces of measurement data to outside.

4. The data communication adaptor according to claim 3, wherein the data-discriminating information is information specifying time and date of measurement or order of measurement; and
wherein the particular condition is that the time and date of measurement are later than those of measurement data previously outputted to the second information processing apparatus.

5. The data communication adaptor according to claim 3, wherein the data-discriminating information is a measurement value; and
wherein the particular condition is that the measurement value is greater than a predetermined threshold value or smaller than the predetermined threshold value.

6. The data communication adaptor according to claim 1, wherein the second information processing apparatus is capable of transmitting data to a plurality of third information processing apparatuses and stores addresses of the respective third information processing apparatuses; and
wherein the controller instructs the data transmitter to select the address corresponding to the identifying information and to transmit the data to the third information processing apparatus corresponding to the selected address.

7. The data communication adaptor according to claim 6, further comprising a data processor for converting a data format to one appropriate for the third data processing apparatus determined by the controller.

8. The data communication adaptor according to claim 1, further comprising an identifying unit for identifying the first information processing apparatus based on individual information that is allocated to the first information processing apparatus and outputted from the first information processing apparatus.

9. The data communication adaptor according to claim 8, wherein the memory is capable of storing a plurality of pieces of individual information; and
wherein the identifying unit compares the individual information outputted from the first information processing apparatus with the pieces of individual information stored in the memory to identify the first information processing apparatus based on the comparison.

10. The data communication adaptor according to claim 9, wherein the controller instructs the memory to store the individual information outputted from the first information processing apparatus when the identifying unit determines that the individual information outputted from the first information processing apparatus is not included in the pieces of individual information stored in the memory.

11. The data communication adaptor according to claim 1, wherein the first information processing apparatus is a portable apparatus for measuring glucose concentration in blood.

12. The data communication adaptor according to claim 1, wherein the second information processing apparatus is a portable communication terminal for transmitting data through a communication line.

13. A data communication adaptor for interconnecting a first information processing apparatus and a second information processing apparatus for inputting data into the second information processing apparatus based on data from the first information processing apparatus, the adaptor comprising an adaptor body, a first terminal for connection to the first information processing apparatus and a second terminal for connection to the second information processing apparatus,
wherein at least one of the first terminal and the second terminal is connected to a cable and further to the adaptor body;
wherein the adaptor body includes a storage section for accommodating the terminal connected to the cable;
wherein the terminal connected to the cable includes a conductor pin;
wherein the storage section includes an inserting portion into which the conductor pin is inserted;
wherein the adaptor body also includes a detector for detecting whether or not the conductor pin is inserted into the inserting portion; and
wherein power to the adaptor is automatically turned off when the detector detects that the conductor pin is inserted into the inserting portion.

14. The data communication adaptor according to claim 13, wherein the storage section is provided at a periphery of the adaptor body and includes a groove for accommodating the cable.

15. The data communication adaptor according to claim 13, wherein the detector also detects whether or not the conductor pin is pulled out of the inserting portion,
wherein power to the adaptor is automatically turned on when the detector detects that the conductor pin is pulled out of the inserting portion.

16. The data communication adaptor according to claim 13, wherein the terminal connected to the cable has a connecting portion to the cable, the connecting portion being covered with a protector having a sectional area larger than that of the cable, and
wherein the storage section includes a first opening having a width corresponding to a sectional configuration of the cable and a second opening having a width larger than that of the first opening and corresponding to a sectional configuration of the protector.

* * * * *